(12) United States Patent
Olshanetsky et al.

(10) Patent No.: US 8,091,583 B2
(45) Date of Patent: Jan. 10, 2012

(54) DOUBLE CHECK VALVE FOR A FUEL SYSTEM

(75) Inventors: Vladimir Olshanetsky, Beer Sheva (IL); Ilan Akian, D.N. Halutza (IL); Yaron Kaspi, D.N. Halutza (IL); Paul Handy, D.N. Halutza (IL); Omer Vulkan, D.N. Halutza (IL)

(73) Assignee: Raval A.C.S. Ltd., D.N. Halutza (IL)

( * ) Notice: Subject to any disclaimer, the term of this patent is extended or adjusted under 35 U.S.C. 154(b) by 159 days.

(21) Appl. No.: 11/921,045

(22) PCT Filed: Feb. 22, 2006

(86) PCT No.: PCT/IL2006/000226
§ 371 (c)(1),
(2), (4) Date: Nov. 26, 2007

(87) PCT Pub. No.: WO2006/134588
PCT Pub. Date: Dec. 21, 2006

(65) Prior Publication Data
US 2009/0126805 A1 May 21, 2009

(30) Foreign Application Priority Data
Jun. 16, 2005 (IL) .......................... 169228

(51) Int. Cl.
*F16K 17/26* (2006.01)
(52) U.S. Cl. .................. 137/493.2; 137/493.8
(58) Field of Classification Search ............... 137/493.1, 137/493.2, 493.7, 493.9, 512.2, 515, 515.15, 137/512.15, 493.8
See application file for complete search history.

(56) References Cited

U.S. PATENT DOCUMENTS

| | | | | |
|---|---|---|---|---|
| 2,135,004 A | * | 11/1938 | Heidloff | 137/493 |
| 2,521,201 A | * | 9/1950 | Clark et al. | 220/203.24 |
| 3,200,843 A | * | 8/1965 | Jackson | 137/614.19 |
| 3,976,096 A | * | 8/1976 | Kass et al. | 137/493.2 |
| 4,040,404 A | * | 8/1977 | Tagawa | 123/519 |
| 4,648,369 A | | 3/1987 | Wannenwetsch | |
| 5,183,075 A | | 2/1993 | Stein | |
| 5,293,897 A | | 3/1994 | Warga et al. | |

(Continued)

FOREIGN PATENT DOCUMENTS

CA 1 182 426 A 2/1985

(Continued)

OTHER PUBLICATIONS

Notice of Reasons for Rejection for corresponding Japanese Application No. 2008-516498 (in Japanese with English translation); mailed Jul. 12, 2011, thirteen pages.

*Primary Examiner* — John Rivell
(74) *Attorney, Agent, or Firm* — The Nath Law Group; Susanne M. Hopkins; William L. Klima

(57) ABSTRACT

Disclosed is a valve having a housing formed with a downstream port and an upstream port, with an axially displaceable plunger biased into sealing engagement of a major flow path extending between the downstream port and the upstream port for admitting flow only in the upstream direction, with the plunger formed having a normally closed minor flow path for admitting flow only in a downstream direction.

17 Claims, 4 Drawing Sheets

U.S. PATENT DOCUMENTS

| | | | |
|---|---|---|---|
| 5,477,829 A | 12/1995 | Hassinger et al. | |
| 5,623,910 A | 4/1997 | Riggle | |
| 6,352,067 B1 | 3/2002 | Genslak | |
| 6,668,802 B2 | 12/2003 | Kiowsky et al. | |
| 6,823,892 B1 * | 11/2004 | Knapp | 137/512.2 |
| 6,837,219 B2 | 1/2005 | York et al. | |
| 2001/0025629 A1 | 10/2001 | Kiowsky et al. | |
| 2002/0074042 A1 * | 6/2002 | Olivas et al. | 137/493.9 |
| 2003/0150492 A1 | 8/2003 | Sato | |
| 2005/0166970 A1 * | 8/2005 | Flynn | 137/538 |
| 2005/0229978 A1 * | 10/2005 | Spears | 137/527.8 |

FOREIGN PATENT DOCUMENTS

| | | |
|---|---|---|
| EP | 64427 A1 * | 11/1982 |
| JP | 49-21232 | 2/1974 |
| JP | 49-104023 | 10/1974 |
| JP | 57-179485 A | 11/1982 |
| JP | 59-3071 U | 1/1984 |
| JP | 1-502286 A | 8/1989 |
| JP | 1-165375 U | 11/1989 |
| JP | 9-310772 A | 12/1997 |
| JP | 2002-81563 A | 3/2002 |
| JP | 2003-240144 A | 8/2003 |
| WO | 2004/027246 | 4/2004 |

* cited by examiner

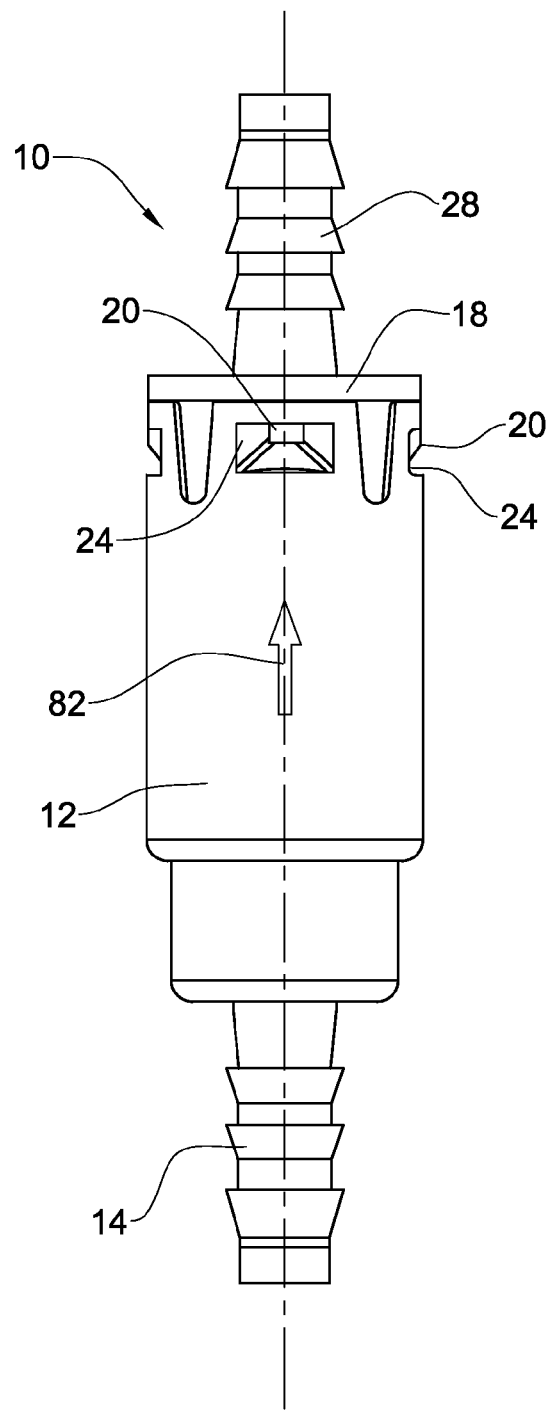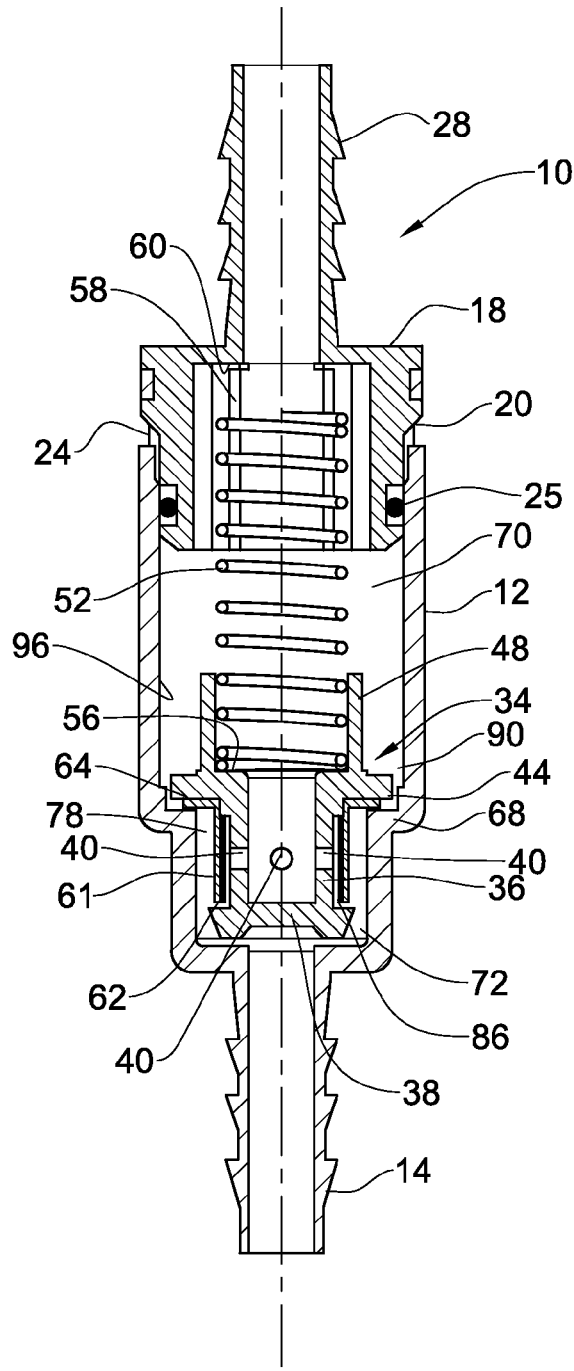
FIG. 1
FIG. 2

DOUBLE CHECK VALVE FOR A FUEL SYSTEM

FIELD OF THE INVENTION

The present invention relates to check valves and more specifically it is concerned with a two way valve serving as a pressure relief valve and as a check valve, suited for fitting, for example, on a fuel line extending between a vehicle's fuel tank and a fuel vapor treating system (typically a canister).

BACKGROUND OF THE INVENTION

In a fuel system of vehicle there is typically provided a fuel tank associated with a fuel pump module connected by a fuel delivery line to the fuel rail and injectors of the engine, with a plurality of valve means provided to regulate fuel and vapor flow.

At locations with a hot climate, the fuel in the tank system expands when the drive stops after an operating phase. It is problematic when the fuel expands in the feed line that connects the tank with the combustion engine, resulting in pressure increase in fuel feed line, which may result in fuel leakage or in malfunctioning of the engine. On the other hand, at low environment temperatures and under fuel consumption, pressure within the fuel tank decreases, which may result in deformation or cracking of the fuel tank.

Thus it is a requirement that a fuel system be suited for fuel supply at a relative high flow rate in a direction from the fuel tank to the engine whilst allowing for venting the fuel tank to prevent vacuum in the fuel tank.

Examples of fuel tank valves of the concerned type are disclosed in the following disclosures:

U.S. Pat. No. 5,477,829 discloses a fuel delivery system for a fuel injected automotive internal combustion engine that has a fuel pump mounted within a fuel tank for pumping fuel through a fuel line to an engine mounted fuel rail which delivers fuel to a plurality of fuel injectors. Attached on the output side of the fuel pump in the fuel line is a pressure valve for controlling fuel flow from the pump to the rail and from the rail to the pump. The pressure valve has a housing for containing a check valve, which opens upon the fuel pump delivering a predetermined pressure to the fuel line, and a pressure relief valve, which opens to allow fuel flow from the fuel line to the output side of the fuel pump when the fuel line is over pressurized. The relief valve has a predetermined set point greater than that of the check valve is mounted in parallel therewith so that pressure in the fuel line is maintained at an appropriate level during long deceleration periods, as well as when the engine is off.

U.S. Pat. No. 5,623,910 discloses a combination check and vent valve assembly for an automotive engine fuel system. The valve assembly has a fuel passage through a housing with an inlet communicating with a fuel pump outlet and an outlet to supply fuel to the engine. A check valve is disposed within the fuel passage which is normally closed when the fuel pump is not operating, and will open when the inlet fuel pressure exceeds the outlet fuel pressure. A normally closed vent valve is disposed within the fuel passage upstream of the check valve and serves as a moveable seat for the check valve, which will open when the valve assembly outlet fuel pressure is greater by a predetermined value than the fuel pump outlet pressure to bleed fuel through the passage and to the pump to reduce the outlet fuel pressure to a predetermined minimum pressure.

U.S. Pat. No. 6,352,067 discloses a fuel system pressure valve includes is interposed in a fuel line between a fuel pump and a fuel rail for controlling fuel flow from the pump to the rail and from the rail to the pump. The valve includes a valve housing having a pair of half sections to form a valve chamber. A check valve is mounted in the chamber and is operable to allow fuel flow from the pump to the fuel line upon the fuel pump delivering a predetermined fuel pressure to the fuel line. A pressure relief valve is mounted within the chamber parallel to the check valve and is operable to allow fuel in the fuel line to flow through the housing to the fuel pump upon fuel pressure in the fuel line exceeding a predetermined relief pressure. In addition, a parasitic flow orifice is mounted in fluid communication with the valve chamber and allows fuel in the valve chamber to flow through the orifice to a fuel tank when valve chamber pressure is below a predetermined valve chamber pressure. Fuel is prevented from flowing through the parasitic flow orifice when the valve chamber pressure exceeds the predetermined valve chamber pressure.

U.S. Pat. No. 6,668,802 discloses a valve arrangement is provided for a feed line to supply fuel from a tank to a combustion engine consisting of a valve housing with an inlet channel and outlet channel, and a valve with a movable valve head to seal the outlet channel from the inlet channel, whereby a feed pump is assigned to the feed line, and the valve head is in closed position when there is no feed pressure from the feed pump. The danger of feed line leakage for combustion engines that burn liquid fuel is eliminated using a coaxial second valve using no additional space to solve the problem. The other essentially coaxial valve within the main valve is in open position opposite the feed direction when the pressure at the outlet channel is greater than the feed pressure. The valve arrangement functions as a check valve when the combustion engine is running, and as an overpressure valve when it is off. The solution does not requiring additional installation space, and can be economically integrated into existing fuel systems without any substantial installation effort.

U.S. Pat. No. 6,837,219 discloses a ported pressure relief valve used in an automotive fuel system includes an unrestricted constant bleed orifice for routing pressurized fuel from a fuel pump back to a fuel source when an engine is running. A check valve prevents flow from a fuel system back to the fuel source when the engine is off, so to retain sufficient pressure in the delivery system that the engine will readily start when cranked. A pressure relief valve drains fuel from the delivery system back to the source of fuel in response to a pressure build up in the fuel delivery system above a predetermined pressure level so to prevent an overpressure condition which would otherwise damage the fuel delivery system.

In a no-return (check valve) as well as in other types of fuel systems, it is desirable to reduce the number of fuel passages, which thereby reduces the number of possible failure modes or leak paths. It is also desirable to reduce the number of parts in a fuel system to simplify the assembly process, to reduce cost and to reduce the size and weight of components.

It is therefore an object of the present invention to provide a two way check valve, where flow parameters in each direction are different, said valve having a simple and cheap design.

SUMMARY OF THE INVENTION

The present invention is directed a two way valve for selective flow in an upstream direction or a downstream direction, depending upon a pressure differential over the valve, wherein flow in both directions is coaxial (i.e. along a common path) and wherein there is provided only a single displaceable plunger within the housing of the valve.

The present invention thus calls for a valve comprising a housing formed with a downstream port and an upstream port, with an axially displaceable plunger biased into sealing engagement of a flow path of a major check valve extending between said downstream port and said upstream port, for admitting flow only in the upstream direction; said plunger being formed with a normally closed flow path of a minor check valve for admitting flow only in a downstream direction.

According to the present invention there is provided a two way valve comprising a housing fitted with a single, axially displaceable plunger constructing a major check valve and a minor check valve; both said check valves being normally closed; said major check valve extending between a sealing rim of said plunger and a corresponding seating shoulder of the housing; said minor check valve being in the form of one or more apertures formed in either a tubular portion or an end portion of the plunger, fitted with a deformable resilient sealing sleeve or cover layer normally sealing said apertures.

The design of the valve is such that flow in both directions extends along a common flow path between the ports of the valve.

According to a particular embodiment of the invention the sealing sleeve is integral with an annular sealing portion sealingly extending at the major check valve.

The plunger is biased into its normally closed position by a spring, one end of which bears against a portion of the housing and an other end of which bears against the plunger. The spring is typically supported over a support stem and/or a support seat.

An upstream side of a flow path of the major check valve has a cross section larger then the downstream side thereof, to thereby allow flow at substantially high flow rate in the upstream direction.

The plunger is biased into its sealed position under force of the biasing member, such that a first predetermined pressure threshold is required to overcome said biasing force, so as to open the major flow path associated with the major check valve. A second pressure threshold governs opening of the minor flow path associated with the minor check valve.

Flow rate through the minor flow path is determined by the overall cross-section area of the apertures formed on the plunger, and the second pressure threshold for opening the minor flow path depends on the elasticity of the deformable resilient sealing sleeve.

To improve performance of the valve, the plunger is designed for only axial displacement within the housing. For that purpose one of the housing and the plunger is fitted with axial guide projections and the other of the housing and the plunger is fitted with axial grooves slidingly engageable with said corresponding guide projections.

According to the design of the valve of the present invention, the housing comprises a cylindrical major flow path extending between a downstream port and an upstream port thereof; a plunger is biased into sealing engagement with a seating shoulder of the housing formed at said major flow path; and the plunger is formed with a tubular section formed with one or more apertures normally sealed by a resilient sleeve mounted on said tubular section, said apertures constituting a minor flow path in direction from the upstream port to the downstream port of the valve.

According to a particular design of the invention there is an annular sealing member mounted on a sealing rim of the plunger for sealing engagement with the seating shoulder of the housing. By one specific design, the resilient sleeve is integral with the annular sealing member.

The valve is packed with a coiled spring biasing the plunger into its normally closed position, by a housing closure member supporting an end of the spring. According to one particular design, said closure member is snap fitted to the housing. According to a modification of the invention, the closure member is axially adjustable with respect to the housing so as to adjust the biasing force of the biasing spring, to thereby adjust the pressure threshold required to open the major flow path. Axial displacement of the closure member could be, for example, by screw coupling to the housing.

The arrangement is such that the plunger constitutes a major check valve admitting flow from a downstream chamber to an upstream chamber associated with the downstream port and the upstream port, respectively, and a normally closed minor check valve fitted on the plunger, admitting flow from said upstream chamber to said downstream chamber.

The valve comprises a maximum of 6 components, assembly of which is simple and fast, thus rendering the valve cheap and reliable.

The valve according to the present invention is suited for installation in different flow control systems. One typical example is a vehicle's fuel system. Typically, the major flow path opens to allow substantially high flow rate of fuel in an upstream direction from the fuel tank towards the fuel treating system towards the engine. At this position the minor flow path remains sealed. The major flow path closes at a reverse flow direction, i.e. when the minor flow path opens, e.g. under vacuum conditions occurring at the fuel tank.

BRIEF DESCRIPTION OF THE DRAWINGS

In order to better understand the invention and to see how it may be carried out in practice, the invention will be described by a non-limiting example, with reference to the annexed drawings, wherein:

FIG. 1 is an elevation of a valve according to the present invention;

FIG. 2 is a longitudinal section of the valve, with both the major flow path and the minor flow path, at their normally closed positions;

DETAILED DESCRIPTION OF THE INVENTION

Figure 3:
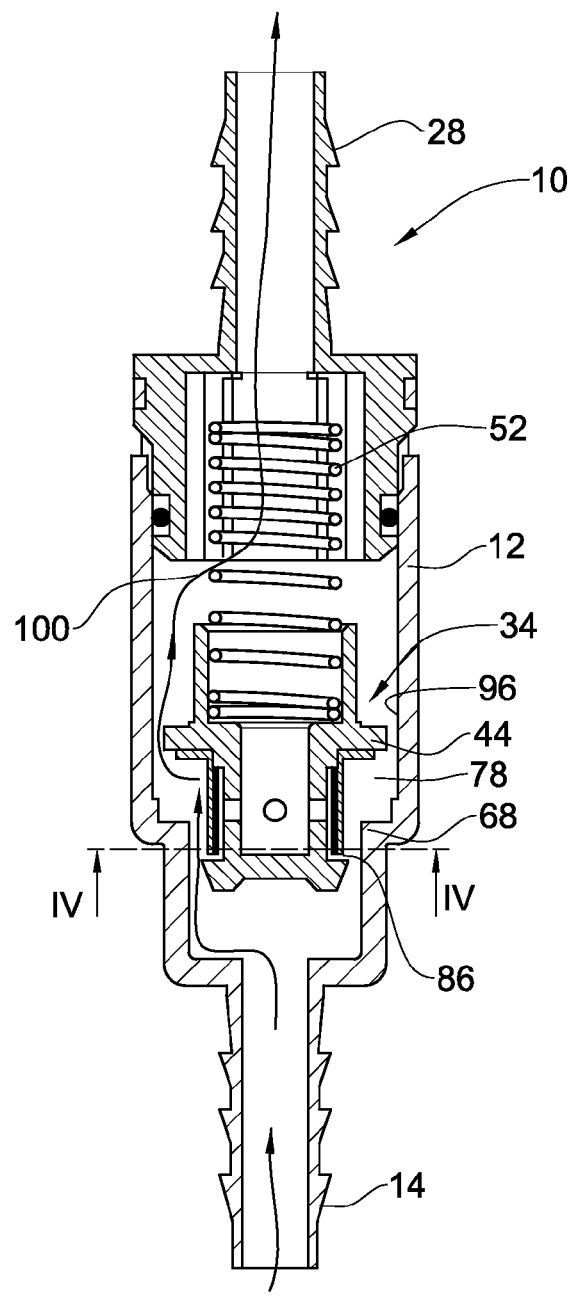
FIG. 3 is a longitudinal section of the valve, with the major flow path at its open position and the minor flow path at its normally closed position.

Attention is first directed to FIGS. 1 and 2 of the drawings illustrating a valve in accordance with the present invention generally designated 10. The valve comprises a cylindrical housing 12 formed with a ribbed downstream port 14, connectable, for example, to a vehicle's fuel tank (not shown). The housing 12 is fitted with a cap 18 articulated to the housing 12 by a plurality of lateral projections snappingly received within corresponding apertures 24 formed in the housing 12. Articulation of cap 18 to housing 12 is sealed by means of a sealing O-ring 25.

Cap 18 is fitted with an upstream port 28 connectable, for example, to a fuel treating system of a vehicle, etc. (not shown).

Axially displaceable within the housing there is an embodiment of a first plunger generally designated 34 comprising a tubular section 36 sealed at a lower end thereof by a wall 38, said tubular section 36 comprising a plurality of radial apertures 40. Laterally projecting from the tubular section 36 there is an annular portion 44 and further, there is formed a tubular spring support 48.

A coiled spring 52 is received within the tubular spring support 48 having one end thereof bearing at shoulder 56 of the first plunger 34, an opposite end of which being mounted on a spring support 58 and bearing against an end wall 60 of the cap 18, so as to bias the first plunger 34 in a direction towards the downstream port 14.

Mounted on the tubular section 36 of first plunger 34 there is a sleeve 61 made of resilient material, e.g. silicon rubber, having a general L-like shape configured such that a first portion thereof 62 extends over apertures 40 of plunger 34 and a second leg portion 64 rests over the annular portion 44 of the plunger 34.

The annular portion 44 of first plunger 34 bears against a support shoulder 68 of the housing 12 with the leg portion 64 extending therebetween, to ensure tight sealing therebetween, thus giving rise to partitioning of the housing 12 into an upstream chamber 70 and a downstream chamber 72.

The above construction gives rise to a major flow path 78, admitting fluid flow only in the direction from the downstream port 14 to the upstream port 28 (as identified by arrow 82 in FIG. 1) and a minor flow path at 86 being a minor check valve facilitating fluid flow only in the direction from the upstream port 28 towards the downstream port 14.

The arrangement is such that both check valves are normally closed and will each open, to facilitate fluid flow in their respective direction, under different pressure thresholds. For example, the major flow path 78 has a pressure threshold of about 4 Kpa with a substantially high flow rate, e.g. 4 liters per minute in an upstream direction. For that purpose the internal section of the housing 12 widens at 90 so as to increase flow rate in the respective direction, once the plunger 34 has displaced to disengage from its sealing position (see FIG. 3).

On the other hand, the minor check valve is designed to open under substantially a low pressure threshold in particular, under vacuum conditions (e.g. −1 Kpa) to facilitate backflow in the direction towards the downstream port 14 and into a fuel tank.

Figure 5A:
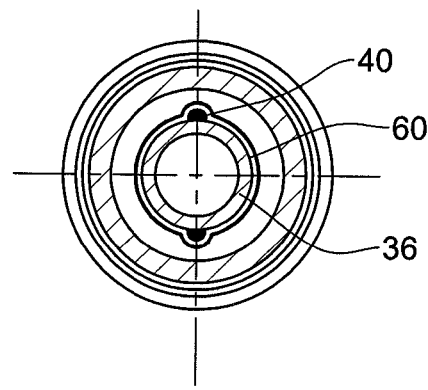
FIG. 5A is a section along line V-V in FIG. 4, illustrating the minor flow path at an open position.
Figure 5B:
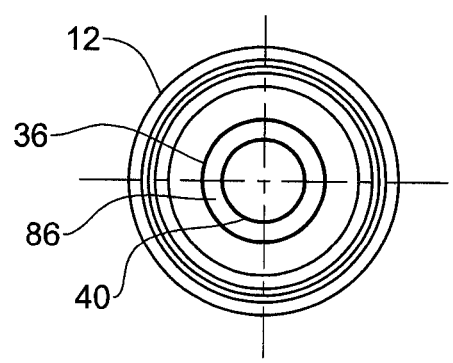
FIG. 5B is a section along line IV-IV in FIG. 3, illustrating the minor flow path at a closed position
Figure 5C:
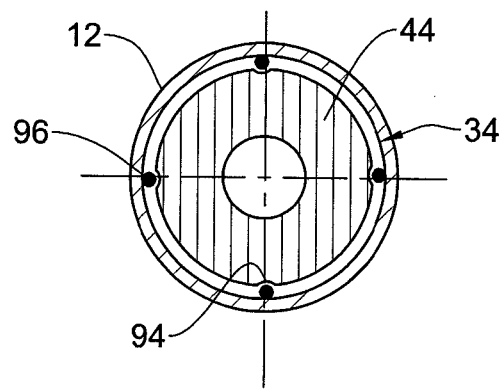
FIG. 5C is a section along line V-V in FIG. 3, illustrating axial support means of the plunger within the housing.

The first plunger 34 is designed for axial displacement only, this being facilitated by four axial depressions 94 formed at peripheral portions of the lateral projection 44, slidingly receiving corresponding axial projections 96 extending along at least a portion of the housing 12 (see FIG. 5C).

With further reference being now made to FIGS. 3 and 5B, the valve 10 is illustrated in a first open position namely where the major flow path 78 is opened upon disengagement of annular portion 44 of first plunger 34 from the support shoulder 68 of the housing 12 facilitating fluid flow in the direction from the downstream port 14 to the upstream port 28, along arrowed line 100. Displacement of first plunger 34 into its open position is facilitated upon contraction of the coiled spring 52 which will take place only under a pressure differential over the first plunger 34 larger than the predetermined pressure threshold.

Figure 8:
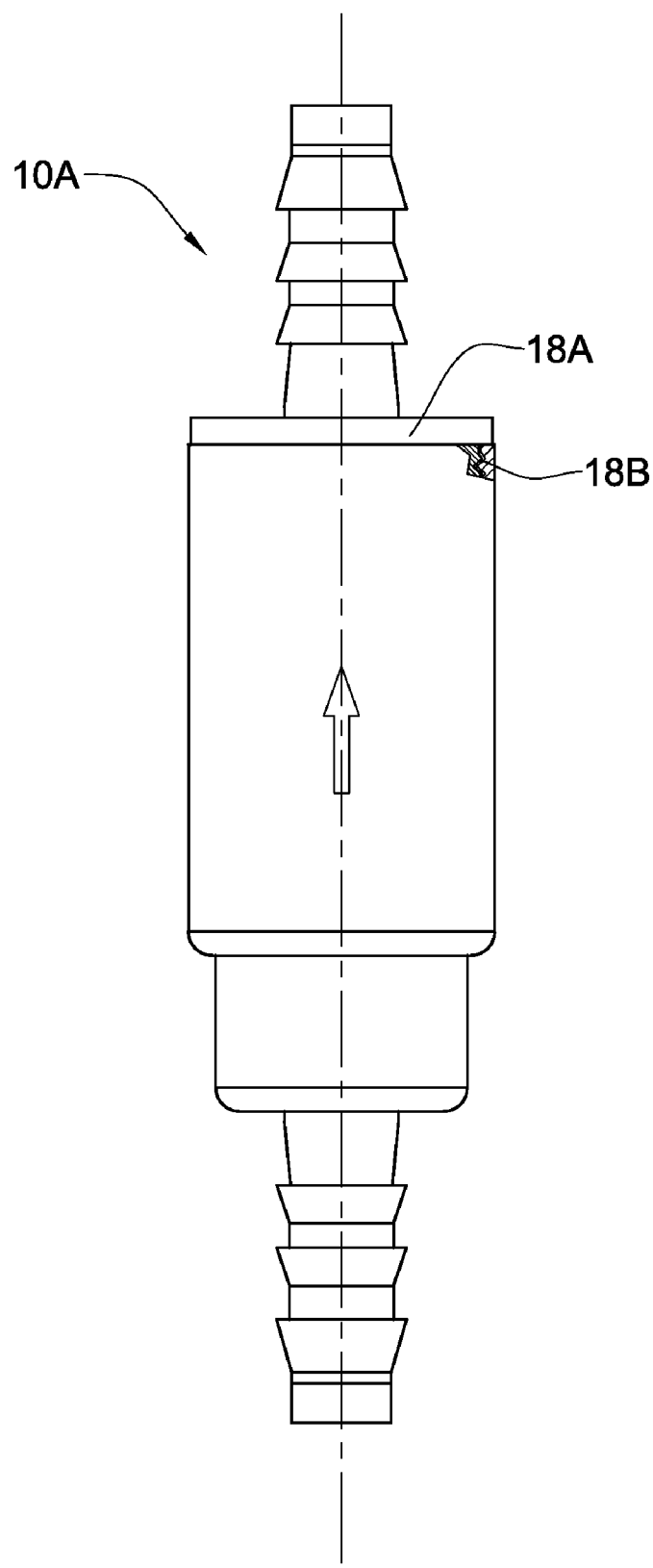
FIG. 8 is an elevation view of a valve embodiment with a closure member screw coupled to the housing.

In accordance with another embodiment of the invention a cap 18A may be articulated to the housing 12 in a manner allowing controlled axial displacement thereof so as to control the pressure threshold required for opening the major flow path 78. This may be facilitated for example as shown in FIG. 8, by the cap 18A being screw coupled via a screw coupling 18B to the housing such that rotation thereof entails a corresponding axial displacement thereof.

Figure 4:
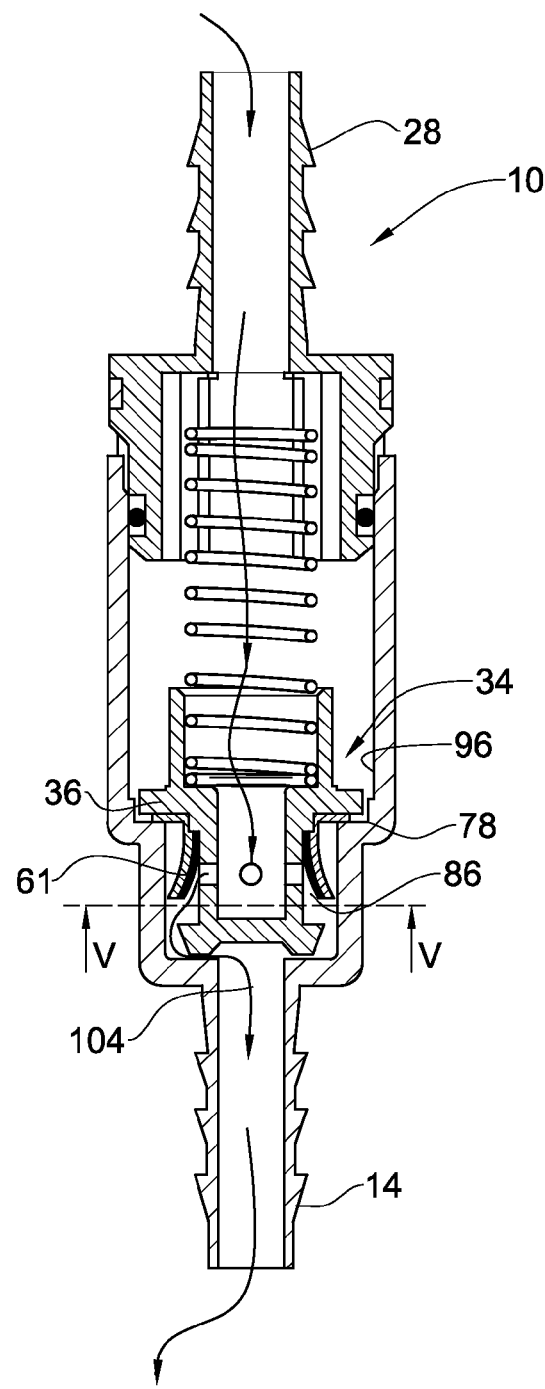
FIG. 4 is a longitudinal section of the valve, with the minor flow path at its open position and the major flow path at its normally closed position.

It is further noticed that in the position of FIG. 3, the minor flow path at 86 remains closed namely, the resilient sleeve 61 sealingly bears over apertures 40 of the tubular portion 36 of first plunger 34. Turning now to FIGS. 4 and 5A, the valve is illustrated in the position where the major flow path 78 is sealed whilst the minor flow path 86 opens to facilitate flow in the direction from the upstream port 28 towards the downstream port 14 (i.e. towards the fuel tank, in the direction of arrowed line 104). This occurs when the differential pressure drops below the minimal pressure threshold (e.g. vacuum conditions) such that the resilient sleeve 61 deforms and disengages from the apertures 40 formed in the tubular section 36 of first plunger 34 such that fluid can flow through the apertures in a downstream direction.

Figure 6:
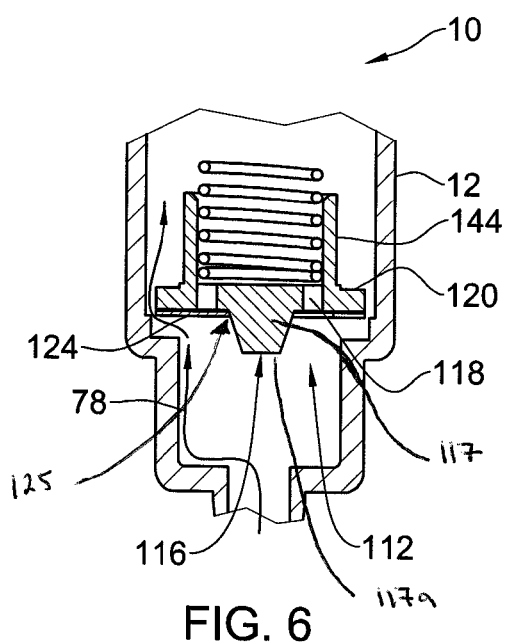
FIG. 6 is a longitudinal section of a portion of the valve with a further embodiment of a plunger, in accordance with the present invention, with the major flow path at its open position and the minor flow path at its normally closed position.
Figure 7:
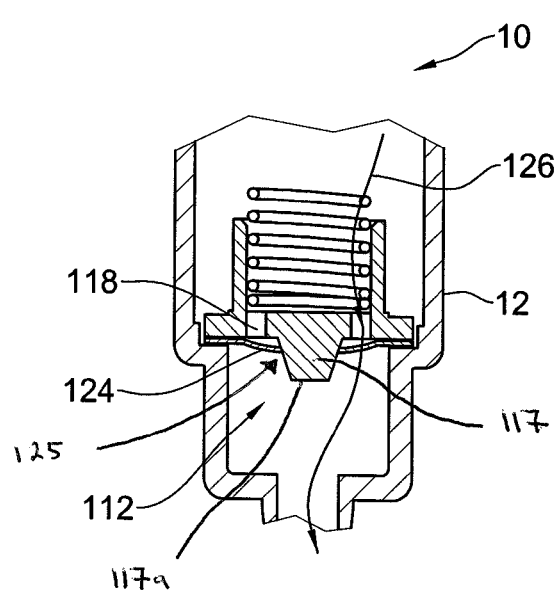
FIG. 7 is a longitudinal section of a portion of the valve with a further embodiment of a plunger, in accordance with the present invention, with the minor flow path at its open position and the major flow path at its normally closed position.

With reference now being made to FIGS. 6 and 7, a cross sectional view of a portion of the valve 10 with a second plunger generally designated 112 is illustrated. Axially displaceable within the housing 12, the second plunger 112 comprises of a tubular portion 144 sealed at a lower end thereof by an end portion 116 having formed therein a plurality of axial apertures 118.

Mounted on the end portion 116 of the second plunger 112 there is a normally flat cover layer 124 which is a deformable resilient sealing member as it is made of resilient material, e.g. silicon rubber, and is configured such that it extends in a sealing fashion over the axial apertures 118 of second plunger 112. In the embodiments shown in FIGS. 6 and 7, the end portion 116 has a central extension 117 axially projecting in a direction away from the tubular portion 144. The central extension 117 extends through an opening 125 formed in the cover layer 124. The exemplary central extension 117 has a varying cross-section, as shown in FIGS. 6 and 7. Specifically, the central extension 117 is tapered. In this example, the central extension is tapered inwardly in a direction away from the tubular portion 144. Further, the cover layer 124 is fitted onto the central extension 117. The cover layer 124 cooperates with the central extension 117 to provide a minor flow path 126.

In operation the above construction facilitates a major flow path 78 similar to that described above regarding the first plunger 34 with the upstream flow blocked from entering the second plunger 112 via the axial apertures 118 by the cover layer 124.

However the minor flow path 126, created in such pressure conditions discussed above, differs in that the second plunger 112 admits fluid flow in the direction from the upstream port 28 to the downstream port 14 via axial apertures 118. A temporary warp in the shape of the cover layer 124, caused during and by said minor flow path, can be seen in FIG. 7, after which the cover layer 112 reverts to its normally flat shape.

Whilst some particular embodiments have been illustrated and described, it will be appreciated by persons skilled in the art that the present invention is not limited by what has been particularly shown by the exemplary embodiments described hereinabove. Thus, it should be understood that numerous additional embodiments are within the scope of the invention, mutatis mutandis.

The invention claimed is:

1. A valve, comprising:
    a housing formed with a downstream port and an upstream port;
    an axially displaceable plunger biased into sealing engagement of a major flow path extending between said downstream port and said upstream port for admitting flow only in an upstream direction;
        said plunger comprising a tubular portion sealed at a lower end thereof by an end portion, the plunger being formed with a normally closed flow path of a minor check valve for admitting flow only in a downstream direction, and a laterally projecting annular portion;
        the minor check valve having one or more axial apertures formed in the end portion of the plunger, and a deformable resilient sealing member forming a normally flat-shaped cover layer fitted on the plunger and configured to normally seal the one or more axial apertures;
        the laterally projecting annular portion of the plunger bearing against a support shoulder of the housing with a portion of the deformable resilient sealing member extending therebetween to ensure tight sealing therebetween;
        the end portion having a central extension axially projecting in a direction away from the tubular portion, the central extension extending through an opening formed in the deformable resilient sealing member;
        wherein when the minor check valve is sealed, a peripheral end of the sealing member bears against the end portion, and an inner end of the sealing member bears against the central extension, thereby sealing the apertures, and
        wherein when the minor check valve is opened, a peripheral end of the sealing member bears against the end portion, and an inner end of the sealing member is deformed away from the central extension, thereby forming fluid communication from the upstream port towards the downstream port through the apertures and in between the deformed sealing member and the central extension.

2. A valve according to claim 1, wherein the plunger constitutes a major check valve admitting flow from a downstream chamber to an upstream chamber associated with the downstream port and the upstream port, respectively.

3. A valve according to claim 1, wherein flow in both directions extends coaxially between the ports of the valve.

4. A valve according to claim 2, wherein an upstream side of the major check valve has a cross section larger than the downstream side thereof, to thereby allow flow at substantially high flow rate in the upstream direction.

5. A valve according to claim 1, wherein the plunger is biased into its normally closed position by a spring, one end of which bears against a portion of the housing and an other end of which bears against the plunger, said spring being supported over a support stem or a support seat.

6. A valve according to claim 1, comprising a maximum of 6 components.

7. A valve according to claim 1, being a fuel valve for fitting intermediate a vehicle's fuel tank and the vehicle's fuel vapor system.

8. A valve according to claim 1, wherein a coiled spring biases the plunger into its normally closed position, said spring being packed by a housing closure member supporting an end of the spring, said closure member is snap fitted to the housing.

9. A valve according to claim 1, wherein the closure member is axially adjustable with respect to the housing so as to adjust the biasing force of the biasing spring, to thereby adjust the pressure threshold required to open the major flow path.

10. A valve according to claim 9, wherein the closure member is screw coupled to the housing, to thereby facilitate axial displacement of the closure member with respect to the housing.

11. A valve according to claim 1, wherein the cover layer is fitted onto the central extension.

12. A valve according to claim 1, wherein the cover layer cooperates with the central extension to provide a minor flow path.

13. A valve according to claim 1, wherein the central extension has a varying cross-section.

14. A valve according to claim 13, wherein the central extension is tapered.

15. A valve according to claim 14, wherein the central extension tapers inwardly in a direction away from the tubular portion.

16. A valve, comprising:
    a housing formed with a downstream port and an upstream port;
    an axially displaceable plunger biased into sealing engagement of a major flow path extending between said downstream port and said upstream port for admitting flow only in an upstream direction;
        said plunger comprising a tubular portion sealed at a lower end thereof by an end portion, the plunger being formed with a normally closed flow path of a minor check valve for admitting flow only in a downstream direction, and a laterally projecting annular portion;
        the minor check valve having one or more axial apertures formed in the end portion of the plunger, and a deformable resilient sealing member forming a normally flat-shaped cover layer fitted on the plunger and configured to normally seal the one or more axial apertures;
        the laterally projecting annular portion of the plunger bearing against a support shoulder of the housing with a portion of the deformable resilient sealing member extending therebetween to ensure tight sealing therebetween;
        the end portion having a central extension axially projecting in a direction away from the tubular portion, the central extension extending through an opening formed in the deformable resilient sealing member
        wherein the central extension has a varying cross-section, and wherein the central extension is tapered.

17. A valve according to claim 16, wherein the central extension tapers inwardly in a direction away from the tubular portion.

* * * * *